United States Patent
Chen et al.

(10) Patent No.: US 9,686,063 B2
(45) Date of Patent: Jun. 20, 2017

(54) TPR MANAGEMENT FOR EPDCCH IN LTE

(71) Applicant: QUALCOMM Incorporated, San Diego, CA (US)

(72) Inventors: Wanshi Chen, San Diego, CA (US); Tao Luo, San Diego, CA (US); Hao Xu, San Diego, CA (US); Taesang Yoo, San Diego, CA (US); Peter Gaal, San Diego, CA (US); Yongbin Wei, San Diego, CA (US); Durga Prasad Malladi, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 164 days.

(21) Appl. No.: 14/199,991

(22) Filed: Mar. 6, 2014

(65) Prior Publication Data
US 2014/0301292 A1    Oct. 9, 2014

Related U.S. Application Data

(60) Provisional application No. 61/808,592, filed on Apr. 4, 2013.

(51) Int. Cl.
*H04L 5/00* (2006.01)
*H04W 52/24* (2009.01)
(Continued)

(52) U.S. Cl.
CPC .......... *H04L 5/0048* (2013.01); *H04L 5/0007* (2013.01); *H04L 5/0032* (2013.01);
(Continued)

(58) Field of Classification Search
CPC ... H04L 5/0073; H04L 5/0053; H04L 5/0048; H04W 48/12; H04B 7/0617; H04B 7/0619
(Continued)

(56) References Cited

U.S. PATENT DOCUMENTS

| 8,605,771 B2 * | 12/2013 | Cairns ................ H04B 1/707 375/147 |
| 2006/0040674 A1 * | 2/2006 | Vannithamby ........ H04L 1/0002 455/452.2 |

(Continued)

OTHER PUBLICATIONS

International Search Report and Written Opinion—PCT/US2014/021617—ISA/EPO—Jun. 26, 2014.
(Continued)

*Primary Examiner* — Jae Y Lee
*Assistant Examiner* — Jean F Voltaire
(74) *Attorney, Agent, or Firm* — Nerrie M. Zohn

(57) ABSTRACT

For an enhanced physical downlink control channel (EPDCCH), unlimited traffic-to-pilot ratio (TPR) variations across resource elements of a physical resource block (PRB) pair is problematic because of the detrimental affect the variations will have on the ability of a user equipment (UE) to perform inter-cell/intra-cell interference suppression (IS) and/or interference cancellation (IC) on EPDCCH of an interfering cell. A TPR limitation is placed on EPDCCH to facilitate IS/IC without causing practical limitations on EPDCCH management by an eNB. Accordingly, a method, an apparatus, and a computer program product for wireless communication are provided. The apparatus identifies a plurality of resource elements of at least one PRB pair for transmitting one or more control channels, divides the plurality of identified resource elements into one or more groups, and restricts a plurality of resource elements in a respective group to a TPR.

28 Claims, 15 Drawing Sheets

(51) Int. Cl.
  *H04W 72/04* (2009.01)
  *H04B 1/707* (2011.01)
  *H04B 7/06* (2006.01)
  *H04J 11/00* (2006.01)

(52) U.S. Cl.
  CPC .......... *H04L 5/0053* (2013.01); *H04L 5/0073* (2013.01); *H04L 5/0092* (2013.01); *H04B 1/707* (2013.01); *H04B 7/0617* (2013.01); *H04J 11/0023* (2013.01); *H04L 5/0062* (2013.01); *H04L 5/0066* (2013.01); *H04W 52/244* (2013.01); *H04W 72/0426* (2013.01)

(58) Field of Classification Search
  USPC .......................................................... 370/329
  See application file for complete search history.

(56) References Cited

U.S. PATENT DOCUMENTS

| | | | | |
|---|---|---|---|---|
| 2011/0122825 A1* | 5/2011 | Lee | ...................... | H04J 11/0069 370/328 |
| 2011/0268046 A1* | 11/2011 | Choi | ...................... | H04L 5/0007 370/329 |
| 2012/0014333 A1* | 1/2012 | Ji | .......................... | H04L 5/0032 370/329 |
| 2012/0040704 A1* | 2/2012 | Kim | ...................... | H04L 5/0064 455/509 |
| 2012/0163334 A1* | 6/2012 | Miki | ..................... | H04L 5/0053 370/330 |

OTHER PUBLICATIONS

Nam Y H., et al., "Evolution of reference signals for LTE-advanced systems", IEEE Communications Magazine IEEE Service Center, Piscataway , US, vol. 50, No. 2, Feb. 1, 2012, pp. 132-138, XP011417049, ISSN: 0163-6804, DOI:10.1109/MCOM.2012. 6146492.

Qualcomm Europe: "System analysis and further details of proposed new coding for E-DPCCH", 3GPP Draft, R1-070545, 3rd Generation Partnership Project (3GPP), Mobile Competence Centre, 650, Route Des Lucioles, F-06921 Sophia-Antipolis Cedex, France, vol. RAN WG1, No. Sorrento, Italy, 20070118, Jan. 18, 2007, XP050104571, [retrieved on Jan. 18, 2007].

* cited by examiner

FIG. 8

| | Total Number of Available REs for EPDCCH | | | | |
|---|---|---|---|---|---|
| | Non-MBSFN 1 Ctrl Sym | Non-MBSFN 2 Ctrl Syms | Non-MBSFN 3 Ctrl Syms | MBSFN 1 Ctrl Sym | MBSFN 2 Ctrl Syms |
| EREG0 | 7 | 6 | 5 | 8 | 7 |
| EREG1 | 6 | 5 | 4 | 8 | 7 |
| EREG2 | 8 | 7 | 6 | 8 | 7 |
| EREG3 | 7 | 6 | 5 | 8 | 7 |
| EREG4 | 8 | 7 | 7 | 8 | 7 |
| EREG5 | 8 | 7 | 6 | 8 | 7 |
| EREG6 | 7 | 6 | 7 | 8 | 7 |
| EREG7 | 8 | 7 | 5 | 8 | 8 |
| EREG8 | 6 | 6 | 6 | 8 | 8 |
| EREG9 | 7 | 7 | 7 | 8 | 8 |
| EREG10 | 8 | 8 | 5 | 8 | 8 |
| EREG11 | 6 | 6 | 7 | 8 | 8 |
| EREG12 | 9 | 8 | 7 | 9 | 8 |
| EREG13 | 9 | 8 | 5 | 9 | 8 |
| EREG14 | 7 | 6 | 7 | 9 | 8 |
| EREG15 | 9 | 8 | 7 | 9 | 8 |

| PRB pair j | 0 | 1 | 2 | 3 | 4 | 5 | 6 | 7 | 8 | 9 | 10 | 11 | 12 | 13 | 14 | 15 |

FIG. 10A

| | ECCE Index | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| PRB pair 0 | 0 | 12 | 8 | 4 | 1 | 13 | 9 | 5 | 2 | 14 | 10 | 6 | 3 | 15 | 11 | 7 |
| PRB pair 1 | 4 | 0 | 12 | 8 | 5 | 1 | 13 | 9 | 6 | 2 | 14 | 10 | 7 | 3 | 15 | 11 |
| PRB pair 2 | 8 | 4 | 0 | 12 | 9 | 5 | 1 | 13 | 10 | 6 | 2 | 14 | 11 | 7 | 3 | 15 |
| PRB pair 3 | 12 | 8 | 4 | 0 | 13 | 9 | 5 | 1 | 14 | 10 | 6 | 2 | 15 | 11 | 7 | 3 |

FIG. 10B

TPR MANAGEMENT FOR EPDCCH IN LTE

CROSS-REFERENCE TO RELATED APPLICATION(S)

This application claims the benefit of U.S. Provisional Application Ser. No. 61/808,592, entitled "TPR MANAGEMENT FOR EPDCCH IN LTE" and filed on Apr. 4, 2013, which is expressly incorporated by reference herein in its entirety.

BACKGROUND

Field

The present disclosure relates generally to communication systems, and more particularly, to managing a traffic-to-pilot ratio (TPR) for an enhanced physical downlink control channel (EPDCCH) in an LTE communication system.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

For an enhanced physical downlink control channel (EPDCCH), unlimited traffic-to-pilot ratio (TPR) variations across resource elements of a physical resource block (PRB) pair is problematic because of the detrimental affect the variations will have on the ability of a user equipment (UE) to perform inter-cell/intra-cell interference suppression (IS) and/or interference cancellation (IC) on EPDCCH of an interfering cell. Accordingly, a TPR limitation may be placed on EPDCCH to facilitate IS/IC without causing practical limitations on EPDCCH management by an eNB.

In an aspect, a method, an apparatus, and a computer program product for wireless communication are provided. The apparatus identifies a plurality of resource elements of at least one PRB pair for transmitting one or more control channels, divides the plurality of identified resource elements into one or more groups, and restricts a plurality of resource elements in a respective group of the one or more groups to a TPR.

BRIEF DESCRIPTION OF THE DRAWINGS

FIG. 8 is a diagram illustrating EREGs mapped to resource elements of a PRB pair.

FIG. 10A is a diagram illustrating the location of EREGs of an ECCE within a PRB pair.

FIG. 10B is diagram illustrating the location of EREGs of an ECCE across PRB pairs.

DETAILED DESCRIPTION

Figure 1:
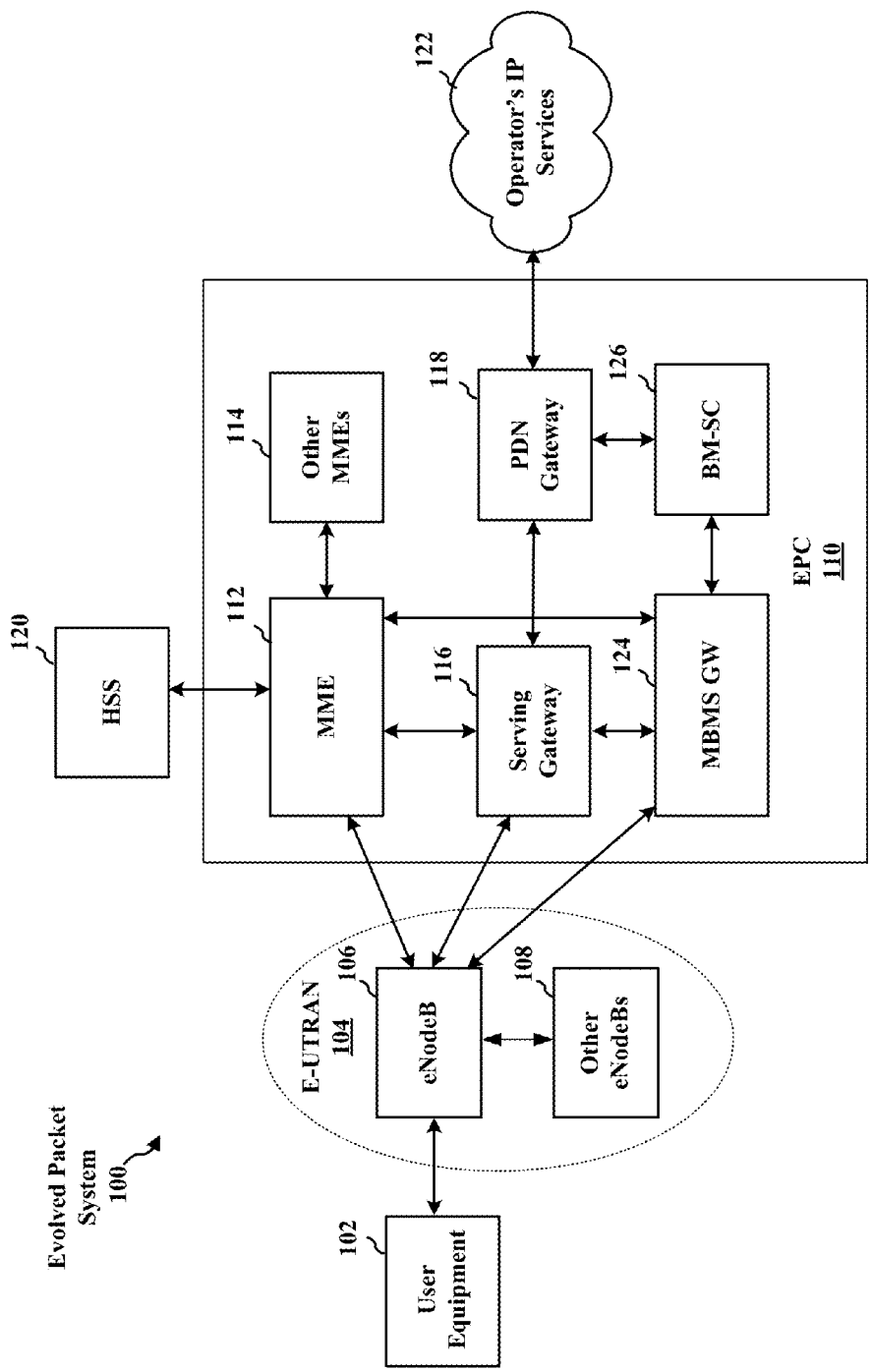
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 includes a Mobility Management Entity (MME) 112, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, an intranet, an IP Multimedia Subsystem (IMS), and a PS Streaming Service (PSS). The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
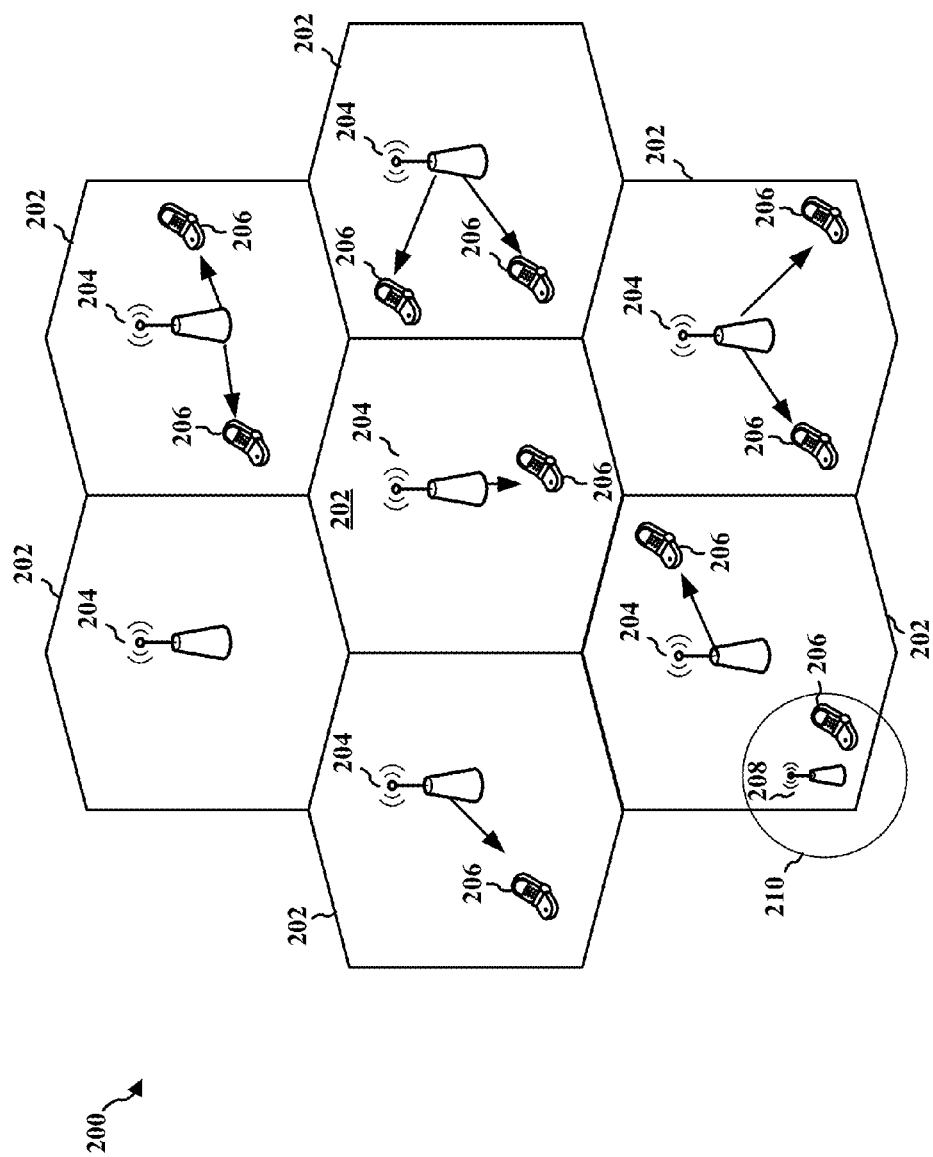
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sector). The term "cell" can refer to the smallest coverage area of an eNB and/or an eNB subsystem serving are particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
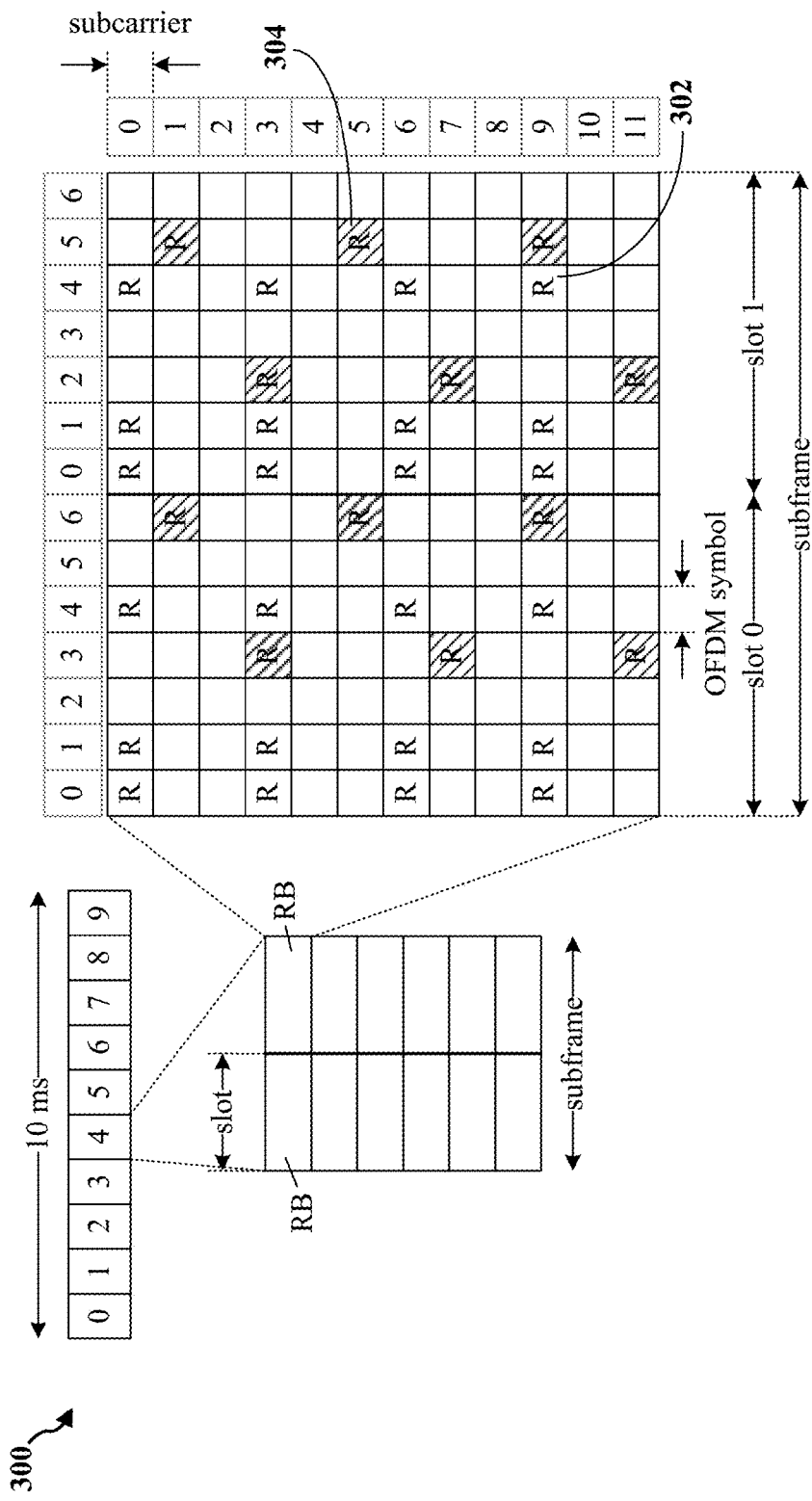
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
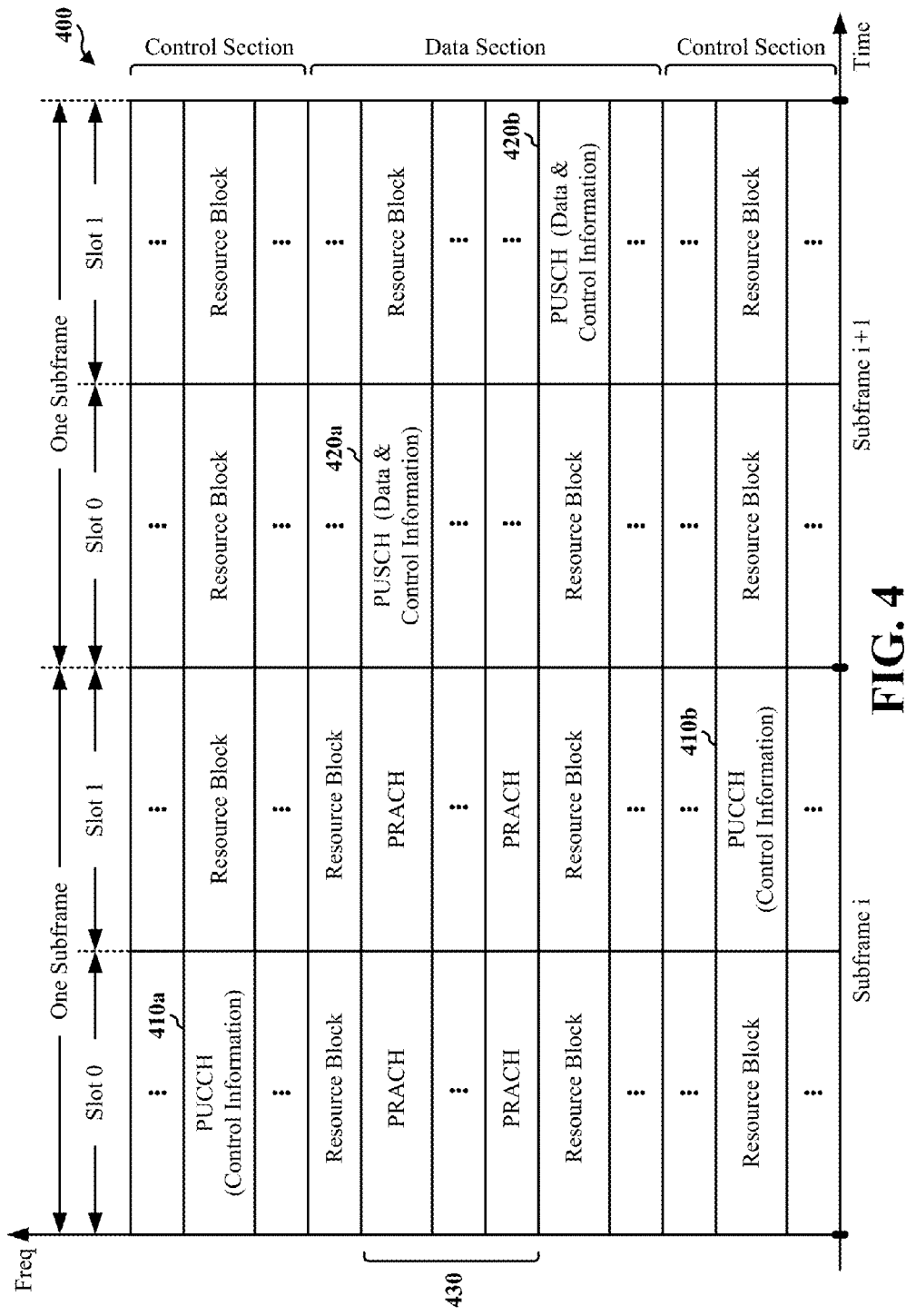
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
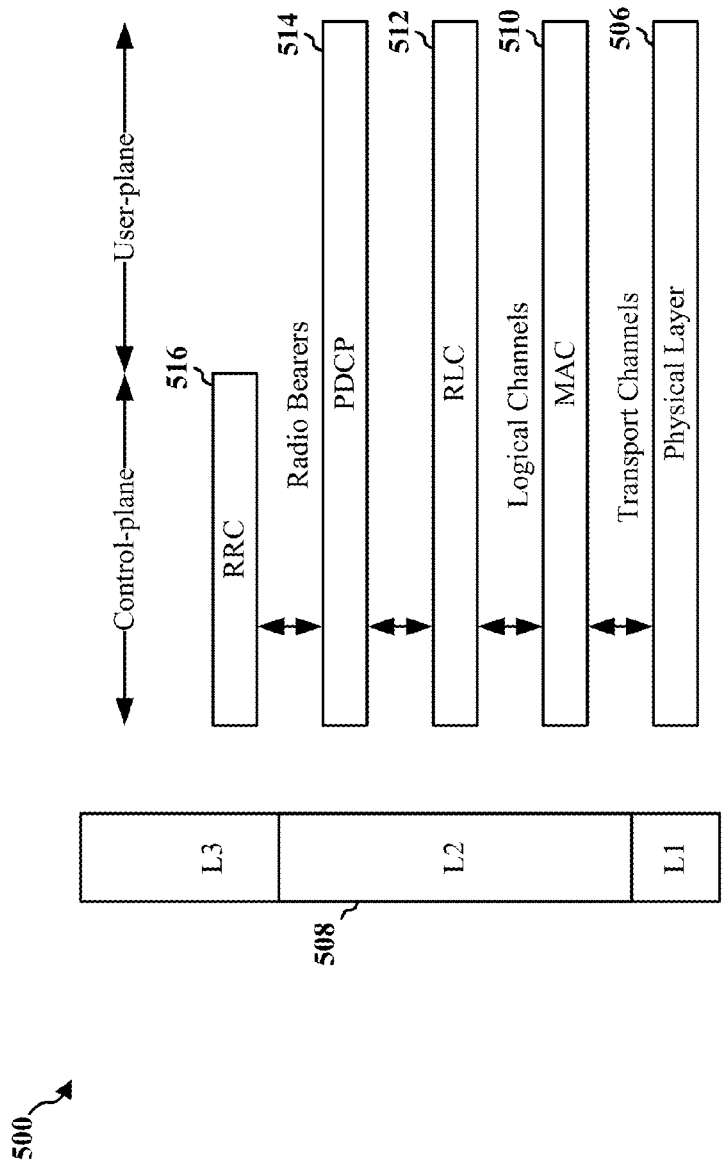
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506.

Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
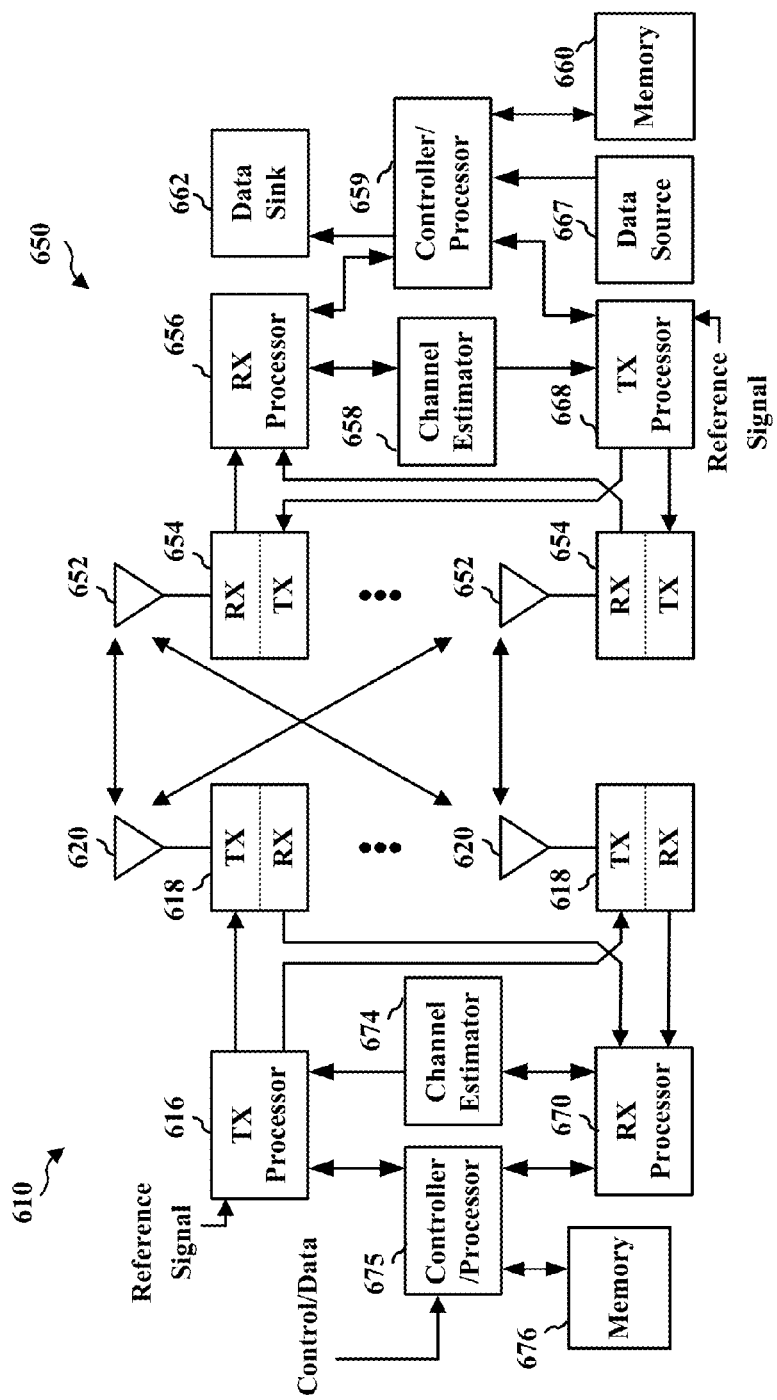
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
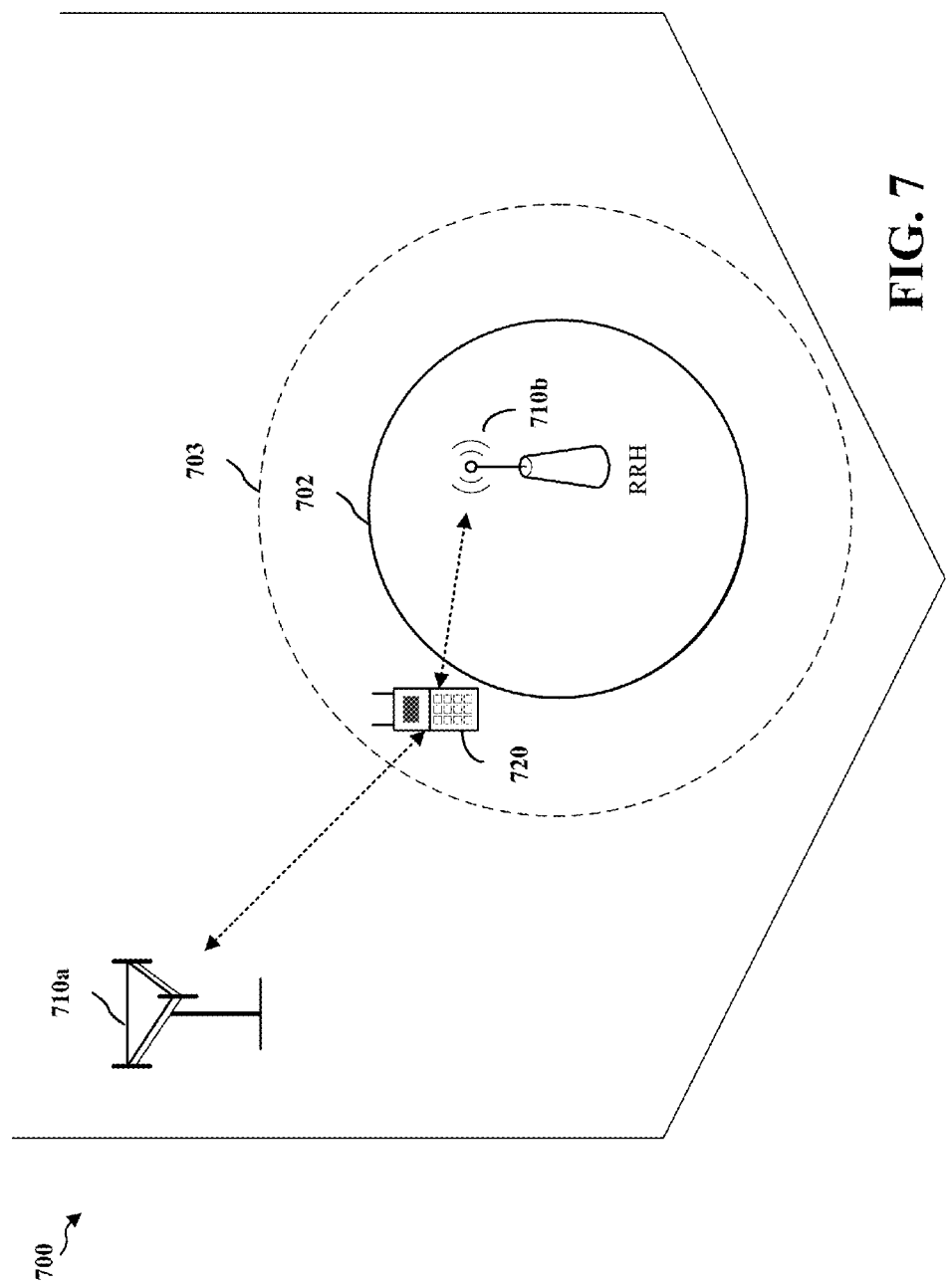
FIG. 7 is a diagram illustrating a range expanded cellular region in a heterogeneous network.

FIG. 7 is a diagram 700 illustrating a range expanded cellular region in a heterogeneous network. A lower power class eNB such as the RRH 710b may have a range expanded cellular region 703 that is expanded from the cellular region 702 through enhanced inter-cell interference coordination between the RRH 710b and the macro eNB 710a and through interference cancellation performed by the UE 720. In enhanced inter-cell interference coordination, the RRH 710b receives information from the macro eNB 710a regarding an interference condition of the UE 720. The information allows the RRH 710b to serve the UE 720 in the range expanded cellular region 703 and to accept a handoff of the UE 720 from the macro eNB 710a as the UE 720 enters the range expanded cellular region 703.

In an aspect, an enhanced physical downlink control channel (ePDCCH) may be configured for transmission in a subset of physical resource blocks (PRBs). This allows for coordination among eNBs to reduce inter-cell/intra-cell interference. The ePDCCH harnesses multi-user diversity and beamforming gains to increase robustness and system performance.

Development of the EPDCCH was motivated by multiple work items in LTE Rel-11, including coordinated multipoint (CoMP), downlink multiple-input-multiple-output (DL MIMO) enhancements, inter-cell interference coordination (ICIC) enhancements, and new carrier types, for example. The EPDCCH may be based on frequency division multiplexing (FDM). Moreover, demodulation reference signal (DM-RS)-based EPDCCH may be supported.

Two operation modes for EPDCCH may be supported: 1) localized EPDCCH; and 2) distributed EPDCCH. In localized EPDCCH, a single precoder may be applied for each physical resource block (PRB) pair. In distributed EPDCCH, two precoders may cycle through allocated resources within each PRB pair.

As discussed above with respect to FIG. 3, a subframe may include two consecutive time slots, each time slot including a resource block. One resource block may be divided into multiple resource elements mapped to 12 consecutive subcarriers in the frequency domain and, for a normal cyclic prefix in each OFDM symbol, 7 consecutive OFDM symbols in the time domain, for a total of 84 resource elements. For an extended cyclic prefix, resource elements of the resource block may be mapped to 12 consecutive subcarriers in the frequency domain and 6 consecutive OFDM symbols in the time domain, for a total of 72 resource elements. A PRB pair may refer to two resource blocks respectively included in the two consecutive time slots of the subframe. Thus, the PRB pair may be divided into multiple resource elements mapped to 12 consecutive subcarriers in the frequency domain and 14 OFDM symbols (normal cyclic prefix) or 12 OFDM symbols (extended cyclic prefix) in the time domain, for a total of 168 resource elements (normal cyclic prefix) or 144 resource elements (extended cyclic prefix).

The EPDCCH may be constructed based on an enhanced resource element group (EREG) and an enhanced control channel element (ECCE).

The EREG may be defined as follows. Assuming a maximum presence of DM-RS in the PRB pair, resource elements (REs) containing DM-RS are excluded from the EREG. Resource elements not containing DM-RS in the PRB pair are included in the EREG. For a normal cyclic prefix, 24 DM-RS resource elements exist. For an extended cyclic prefix, 16 DM-RS resource elements exist. Accordingly, for a normal cyclic prefix, the EREG includes 144 resource elements ((12 carriers×14 OFDM symbols)−24 DM-RS REs=144 REs). For an extended cyclic prefix, the EREG includes 128 resource elements ((12 carriers×12 OFDM symbols)−16 DM-RS REs=128 REs).

A PRB pair may be divided into 16 EREGs, regardless of a subframe type, cyclic prefix type, a PRB pair index, a subframe index, etc. For a normal cyclic prefix, an EREG may include 9 resource elements. For an extended cyclic prefix, an EREG may include 8 resource elements.

The mapping of an EREG to resource elements may follow a cyclic/sequential and frequency-first-time-second manner. This is beneficial to equalizing the number of available resource elements per EREG.

Figure 8:
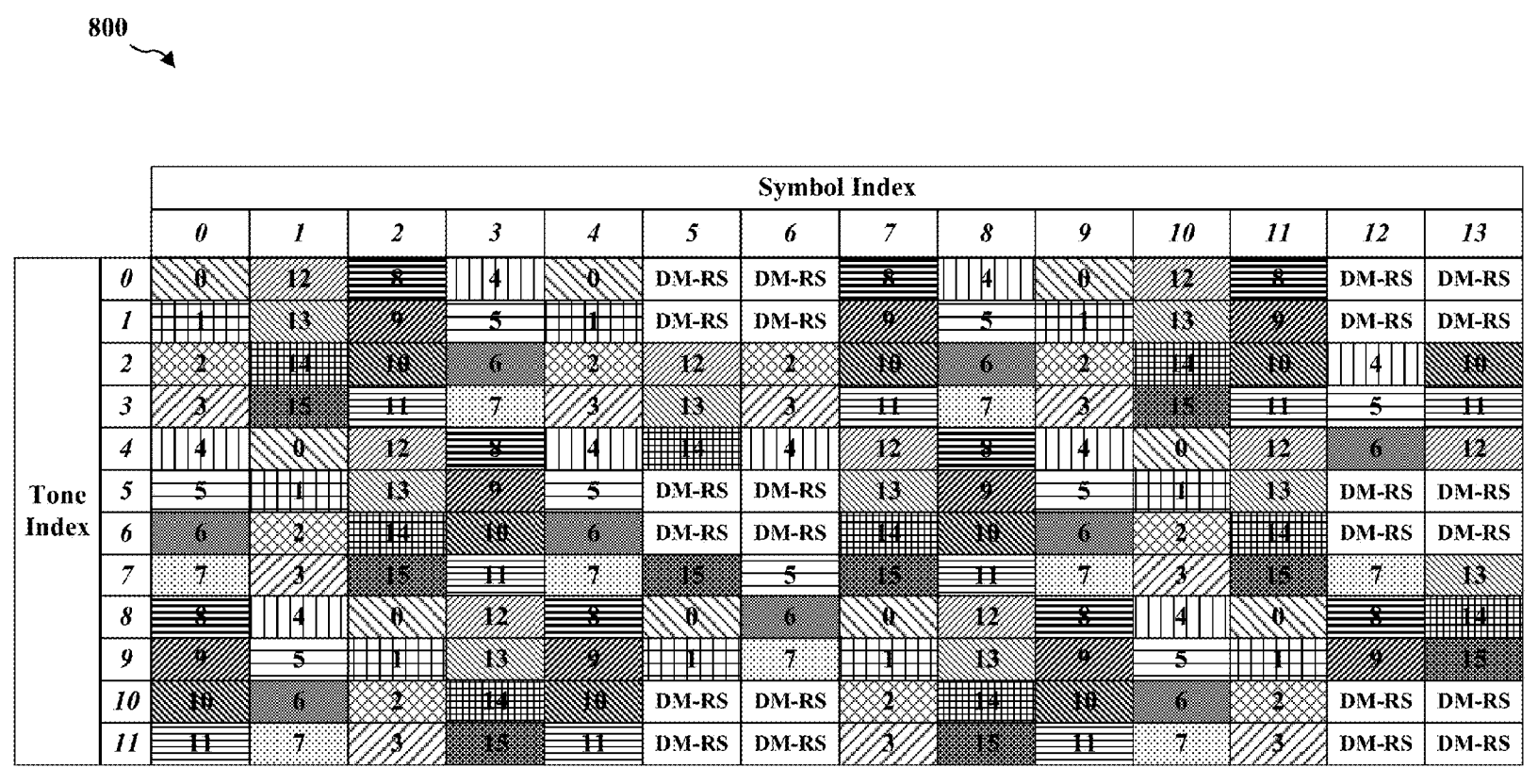

FIG. 8 is a diagram 800 illustrating EREGs mapped to resource elements of a PRB pair. Referring to FIG. 8, 16 EREGs are sequentially defined among resource elements of one PRB pair in a frequency-first-time-second manner, excluding the resource elements containing DM-RS. As shown, one EREG is mapped to 9 resource elements (for a normal cyclic prefix). Resource elements belonging to the same EREG are denoted by the same shade pattern.

Figure 9:
FIG. 9 is a diagram illustrating a number of available resource elements for EPDCCH.

FIG. 9 is a diagram 900 illustrating a number of available resource elements for EPDCCH. Due to the presence of other signals, the number of available resource elements (REs) for EPDCCH is not fixed and can be different for different EREGs in a PRB pair. For example, the values depicted in the diagram 900 assume two CRS ports with a frequency shift of 0, a normal cyclic prefix (CP), a normal subframe and no CSI-RS, different subframe types (MBSFN vs. non-MBSFN subframes), and various legacy control region sizes (e.g., 1, 2 or 3 control symbols).

The ECCE may be defined as follows. A number of EREGs per ECCE may be N=4 or 8. N may be equal to 4 for a normal cyclic prefix and a normal subframe or special subframe configurations 3, 4, 8 (e.g., when the number of resource elements per PRB pair is large. N=4 corresponds to four ECCEs per PRB pair. Otherwise, N is equal to 8 corresponding to two ECCEs per PRB pair.

The ECCE is further based on EREG grouping. Regardless of localized or distributed EPDCCH, four EREG groups may be formed. For example, Group #0 may include EREGs {0,4,8,12}; Group #1 may include EREGs {1,5,9,13}; Group #2 may include EREGs {2,6,10,14}; and Group #3 may include EREGs {3,7,11,15}. When an ECCE is formed by four EREGs, an ECCE is considered to be formed by one EREG group. When an ECCE is formed by eight EREGs, an ECCE is considered to be formed by two EREG groups. For example, the two EREG groups may be EREG Groups #0 and #2 or EREG Groups #1 and #3.

The location of EREGs of an EREG group in the PRB pair depends on an EPDCCH mode. For localized EPDCCH, EREGs of the same group may be located in the same PRB pair. For distributed EPDCCH, EREGs of the same group may be located in different PRB pairs. A detailed mapping of the location of the EREGs of the same EREG group may depend on the number of PRB pairs configured for EPDCCH.

FIG. 10A is a diagram 1000 illustrating the location of EREGs of an ECCE within a PRB pair. Referring to FIG. 10A, for a localized EPDCCH, each ECCE is defined within a given PRB pair (e.g., PRB pair j). As shown, EREGs belonging to the same ECCE (same EREG group) are denoted by the same shade pattern. A value within a shaded box corresponds to an EREG index.

FIG. 10B is diagram 1050 illustrating the location of EREGs of an ECCE across PRB pairs. Referring to FIG. 10B, for a distributed EPDCCH, each ECCE is defined across PRB pairs (PRB pair 0, PRB pair 1, PRB pair 2, and PRB pair 3). For example, ECCE 0 comprises EREG 0 of PRB pair 0, EREG 4 of PRB pair 1, EREG 8 of PRB pair 2, and EREG 12 of PRB pair 3. The four PRB pairs in the example may not be contiguous in frequency. Hence, the PRB pairs containing EREGs of an ECCE may be frequency distributed.

Figure 11A:
FIG. 11A is diagram illustrating a number of available resource elements per ECCE with no CSI-RS resources.
Figure 11B:
FIG. 11B is a diagram illustrating a number of available resource elements per ECCE with three CSI-RS resources for each of four ports.

FIG. 11A is diagram 1100 illustrating a number of available resource elements per ECCE with no CSI-RS resources. FIG. 11B is a diagram 1150 illustrating a number of available resource elements per ECCE with three CSI-RS resources for each of four ports. Referring to FIGS. 11A and 11B, similar to EREG, the number of available resource elements per ECCE for EPDCCH is not fixed and can be different for different ECCEs. However, defining the ECCE based on EREG grouping helps equalize the number of available resource elements per ECCE.

In an aspect, each UE can be configured with up to K=2 EPDCCH resource sets, where each resource set is: 1) separately configured with M=2, 4, or 8 PRB pairs; and/or 2) separately configured with either a localized mode or distributed mode.

In a search space for localized EPDCCH and/or distributed EPDCCH, the candidates of a given aggregation level (AL) are spaced in as many different PRB pairs as possible in order to exploit subband scheduling for EPDCCH as much as possible.

In LTE Rel-11, the resource elements occupied by other signals known to the UE are rate-matched around by EPDCCH. The other signals may include, e.g., legacy control region signals, CRS, and UE-specifically configured CSI-RS.

Figure 12:
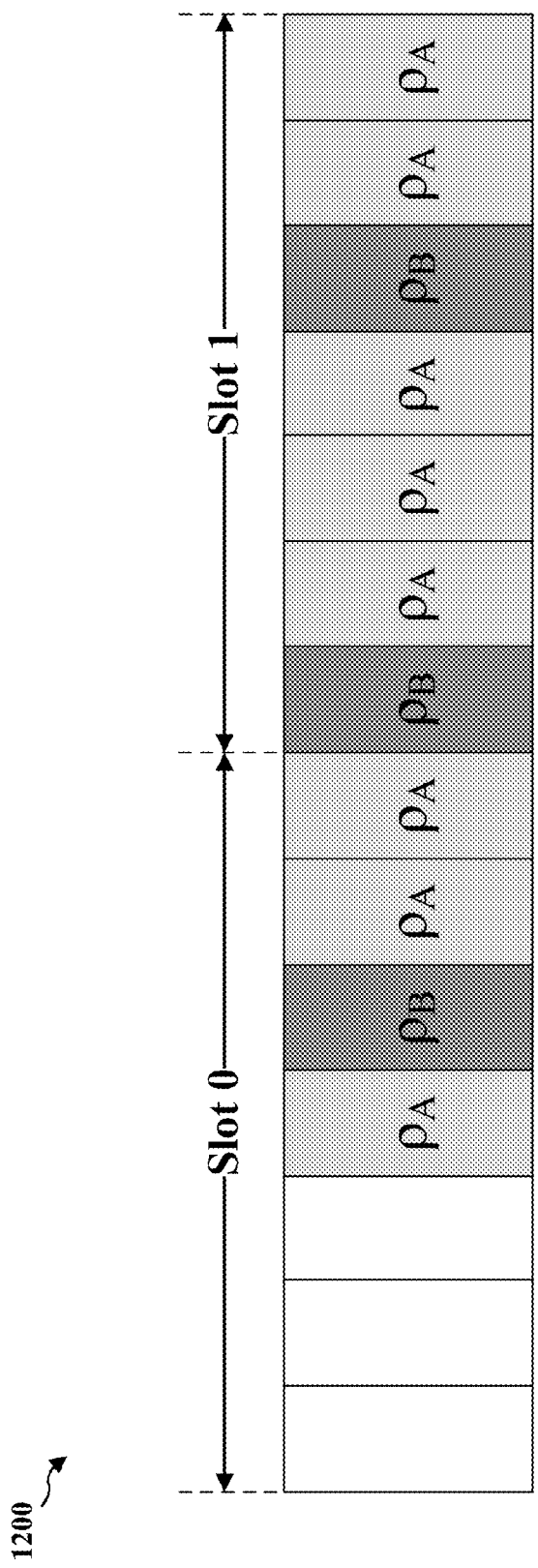
FIG. 12 is a diagram illustrating a traffic-to-pilot ratio (TPR) for a physical downlink shared channel (PDSCH).

FIG. 12 is a diagram 1200 illustrating a traffic-to-pilot ratio (TPR) for a physical downlink shared channel (PDSCH). Referring to FIG. 12, a traffic-to-pilot ratio for UE-RS based PDSCH may be described. In symbols containing UE-RS, the UE may assume the ratio of a PDSCH energy per resource element (EPRE) to UE-specific RS EPRE is 0 dB for a number of transmission layers less than or equal to two. Otherwise, the ratio is −3 dB. Across different symbols, the ratio is governed by the cell-specific parameter P_B which is mapped to a value of $\rho\_A/\rho\_B$, where P_B may be two bits in length indicating four possible values.

The TPR for EPDCCH may vary per resource element. However, having no TPR limitation on EPDCCH is problematic. For example, unlimited TPR variations across resource elements may be detrimental to inter-cell/intra-cell interference suppression (IS) and/or interference cancellation (IC). A UE in question may detect and perform IS/IC for an EPDCCH of an interfering cell or an EPDCCH in a same cell (e.g., due to MU-MIMO operation for EPDCCH). Therefore, it is advantageous to efficiently place a TPR limitation on EPDCCH to facilitate IS/IC without causing practical limitations on EPDCCH management by an eNB.

In an aspect, a TPR may be restricted to be the same TPR across resource elements within an EREG or an ECCE for an EPDCCH, regardless of the OFDM symbols. For example, for a normal cyclic prefix and nine resource elements per EREG, the resource elements among the nine resource elements for an EPDCCH would have the same TPR. It is noted that some of the nine resource elements may not be available for the EPDCCH (e.g., due to the presence of other signals as discussed earlier). These resource elements in an EREG unavailable for the EPDCCH may or may not have the same TPR as the TPR for the resource elements in the EREG for the EPDCCH. Across EREGs of the same EPDCCH, the TPR may vary.

Alternatively, the TPR variation may further be restricted across different PRB pairs. That is, all EREGs of the same PRB pair for the same EPDCCH would have the same TPR. However, across different PRB pairs for the same EPDCCH, the TPR may vary.

In another alternative, the TPR variation may be restricted across different EREG groups (or ECCEs). For localized EPDCCH, EREGs of the same EREG group (same ECCE) are located in the same PRB pair. For distributed EPDCCH, EREGs of the same EREG group (same ECCE) are distributed over multiple PRB pairs. For example, referring to FIG. 10B, the UE can assume that EREG 0 of PRB pair 0, EREG 4 of PRB pair 1, EREG 8 of PRB pair 2 and EREG 12 of PRB pair 3 for an EPDCCH are of the same TPR, since these EREGs are of the same EREG group (same ECCE). If the same TPR is used, the TPR would be used for a same EPDCCH.

In an aspect, the UE may be indicated/informed of which PRB pairs are associated with a distributed EPDCCH. This allows the UE to determine EREGs of the same group.

In an aspect, a TPR may be restricted to be the same across resource elements within an OFDM symbol for an EPDCCH. However, the TPR may vary across different OFDM symbols. For example, an EPDCCH may have six resource elements (over four PRB pairs) in a first OFDM symbol of a first TPR, and two resource elements (over four PRB pairs) in a second OFDM symbol of a second TPR. Moreover, the first TPR may be different from the second TPR.

A ratio between the TPRs in different OFDM symbols may not be random. The ratio may be governed by a certain value(s). For example, similar to PDSCH, the ratio between the TPR in a CRS symbol and the TPR in a non-CRS symbol may be governed by P_B (see FIG. 12 and corresponding description). Other solutions may be possible, e.g., two or more ratios to address more than two patterns.

Within the same symbol, the same TPR may be within the same EREG, the same ECCE (or the same EREG group), the same PRB pair, or all resource elements associated with an EPDCCH.

In an aspect, a serving cell and/or non-serving cells may indicate to a UE the TPR operations for EPDCCH of the serving cell and/or non-serving cells. The indication for TPR operations for EPDCCH of the serving cell and/or the non-serving cell(s) can be separately or jointly coded. A single TPR operation (e.g., an EREG-based TPR operation)

or two or more TPR operations may be employed by a cell. The indication may be broadcast or unicast. The indication may be from the serving cell or non-serving cells for the UE. If there is no such indication, the UE may assume a default operation (e.g., EREG-based TPR operation), or blindly detect which operation is in use if two or more operations are possible for a cell.

Figure 13:
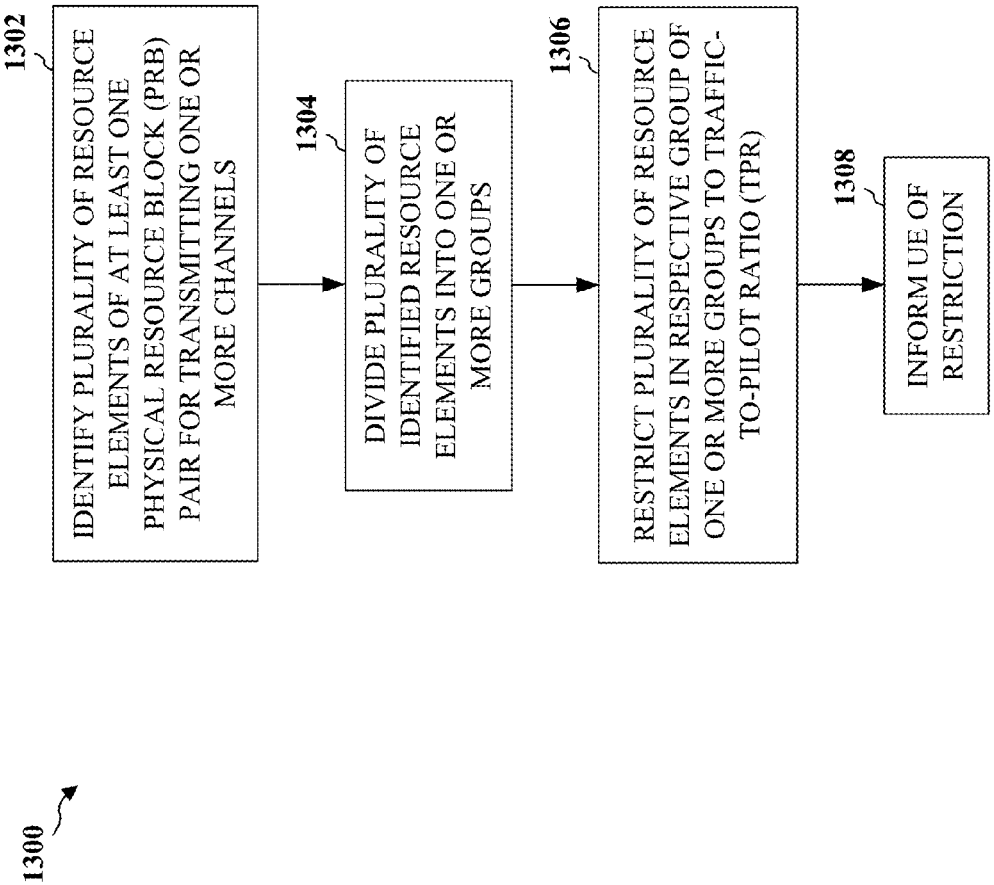
FIG. 13 is a flow chart of a method of wireless communication.

FIG. 13 is a flow chart 1300 of a method of wireless communication. The method may be performed by an eNB. At step 1302, the eNB identifies a plurality of resource elements of at least one physical resource block (PRB) pair for transmitting one or more control channels (e.g., one or more EPDCCHs). The at least one PRB pair may include at least one resource element that is not allocated for a control channel transmission.

At step 1304, the eNB divides the plurality of identified resource elements into one or more groups (e.g., EREGs). At step 1306, the eNB restricts a plurality of resource elements in a respective group of the one or more groups to a traffic-to-pilot ratio (TPR) (e.g., same TPR). At step 1304, the eNB may inform a user equipment (UE) of the restriction.

In an aspect, the plurality of resource elements may include all resource elements in the respective group. In another aspect, all resource elements of all groups in a PRB pair may have a same TPR. In a further aspect, the TPR is a first TPR and the respective group is a first group. Accordingly, the eNB may restrict a plurality of resource elements of a second group from the one or more groups to a second TPR, wherein the first TPR is different from the second TPR. Moreover, the first group may be associated with a first control channel transmission, the second group may be associated with a second control channel transmission, and the second control channel transmission may be different from the first control channel transmission.

In an aspect, the eNB may divide the one or more groups into a plurality of control channel elements (e.g., ECCEs). Each control channel element may include a number of groups (e.g., EREGs). Accordingly, the eNB may restrict a plurality of resource elements of each group in a respective control channel element of the plurality of control channel elements to the TPR. The eNB may further restrict all resource elements of each group in the respective control channel element to the TPR.

In an aspect, the TPR is a first TPR and the respective control channel element is a first control channel element. Accordingly, the eNB may restrict a plurality of resource elements of each group of a second control channel element from the plurality of control channel elements to a second TPR, wherein the first TPR may be different from the second TPR. The first control channel element may be associated with a first control channel transmission, the second control channel element may be associated with a second control channel transmission, and the second control channel transmission may be different from the first control channel transmission.

In an aspect, the groups of a control channel element may be located in the same PRB pair, such as the case for localized EPDCCH. Alternatively, the groups of a control channel element may be distributed across a plurality of PRB pairs, such as the case for distributed EPDCCH. As such, at step 1308, the eNB may also inform the UE of a set of PRB pairs associated with a distributed group of a control channel element.

In an aspect, the plurality of resource elements having a same TPR are of a same symbol duration of the at least one PRB pair. A plurality of resource elements of a first symbol duration of the at least one PRB pair may have a first TPR, a plurality of resource elements of a second symbol duration of the at least one PRB pair may have a second TPR, and the first TPR may be different from the second TPR. A ratio between the first TPR and the second TPR may be based on a value, wherein the value is determined on a per cell basis.

Figure 14:
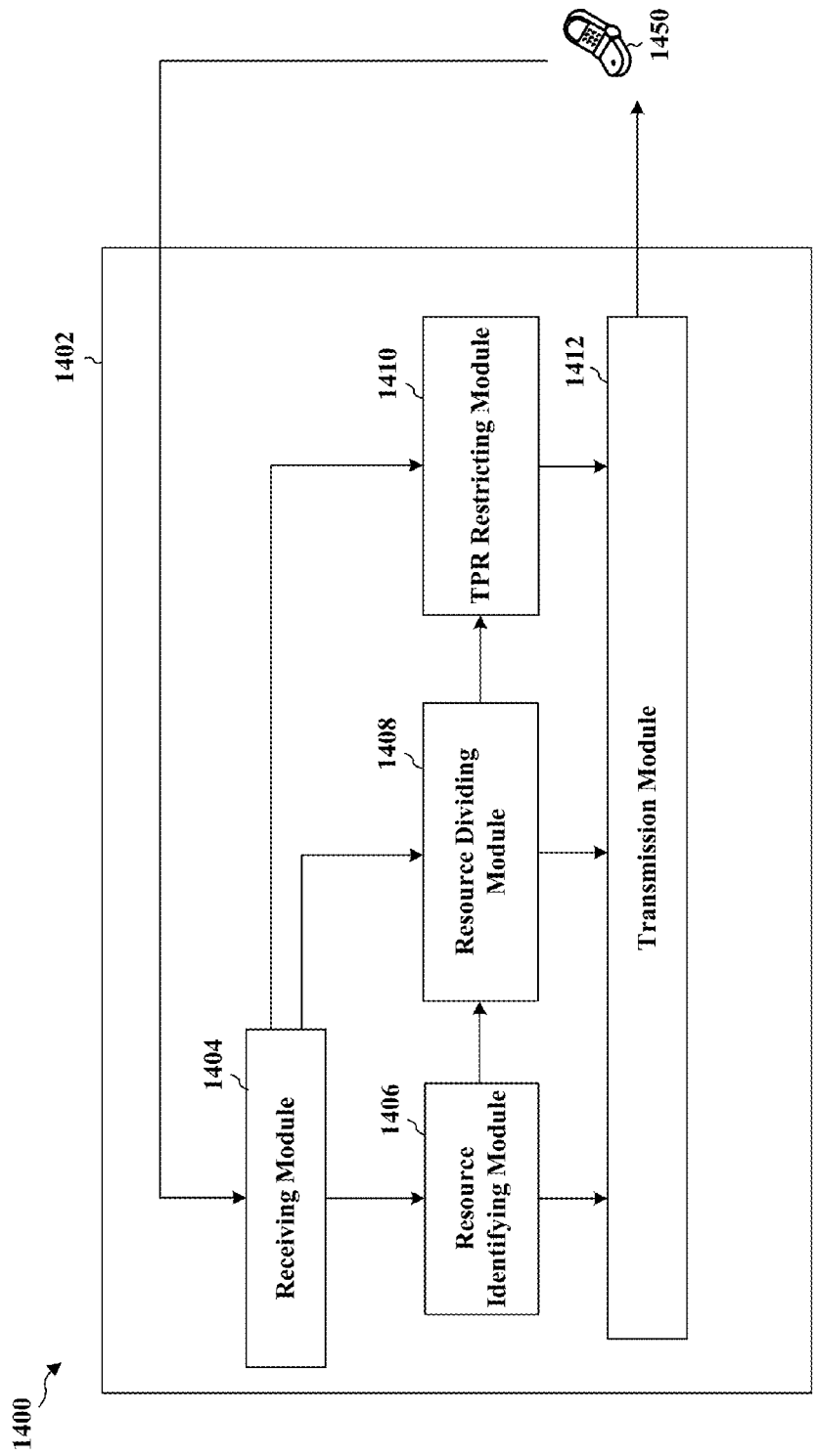
FIG. 14 is a conceptual data flow diagram illustrating the data flow between different modules/means/components in an exemplary apparatus.

FIG. 14 is a conceptual data flow diagram 1400 illustrating the data flow between different modules/means/components in an exemplary apparatus 1402. The apparatus may be an eNB. The apparatus includes a receiving module 1404, a resource reserving module 1406, a resource dividing module 1408, a TPR restricting module 1410, and a transmission module 1412.

The receiving module 1404 may receive signals from a UE 1450. The resource identifying module 1406 identifies a plurality of resource elements of at least one physical resource block (PRB) pair for transmitting one or more control channels (e.g., one or more EPDCCHs). The at least one PRB pair may include at least one resource element that is not allocated for a control channel transmission.

The resource dividing module 1408 divides the plurality of identified resource elements into one or more groups (e.g., EREGs). The TPR restricting module 1410 restricts a plurality of resource elements in a respective group of the one or more groups to a traffic-to-pilot ratio (TPR) (e.g., same TPR). The restricting module 1410 may inform (via the transmission module 1412) the UE 1450 of the restriction.

In an aspect, the plurality of resource elements may include all resource elements in the respective group. In another aspect, all resource elements of all groups in a PRB pair may have a same TPR. In a further aspect, the TPR is a first TPR and the respective group is a first group. Accordingly, the TPR restricting module 1410 may restrict a plurality of resource elements of a second group from the one or more groups to a second TPR, wherein the first TPR is different from the second TPR. Moreover, the first group may be associated with a first control channel transmission, the second group may be associated with a second control channel transmission, and the second control channel transmission may be different from the first control channel transmission.

In an aspect, the resource dividing module 1408 may divide the one or more groups into a plurality of control channel elements (e.g., ECCEs). Each control channel element may include a number of groups (e.g., EREGs). Accordingly, the TPR restricting module 1410 may restrict a plurality of resource elements of each group in a respective control channel element of the plurality of control channel elements to the TPR. The TPR restricting module 1410 may further restrict all resource elements of each group in the respective control channel element to the TPR.

In an aspect, the TPR is a first TPR and the respective control channel element is a first control channel element. Accordingly, the TPR restricting module 1410 restricts a plurality of resource elements of each group of a second control channel element from the plurality of control channel elements to a second TPR, wherein the first TPR may be different from the second TPR. The first control channel element may be associated with a first control channel transmission, the second control channel element may be associated with a second control channel transmission, and the second control channel transmission may be different from the first control channel transmission.

In an aspect, the groups of a control channel element may be located in the same PRB pair, such as the case for localized EPDCCH. Alternatively, the groups of a control channel element may be distributed across a plurality of PRB pairs, such as the case for distributed EPDCCH. As such, the resource dividing module 1408 may inform (via the transmission module 1412) the UE 1450 of a set of PRB pairs associated with a distributed group of a control channel element.

In an aspect, the plurality of resource elements having a same TPR are of a same symbol duration of the at least one PRB pair. A plurality of resource elements of a first symbol duration of the at least one PRB pair may have a first TPR, a plurality of resource elements of a second symbol duration of the at least one PRB pair may have a second TPR, and the first TPR may be different from the second TPR. A ratio between the first TPR and the second TPR may be based on a value, wherein the value is determined on a per cell basis.

The apparatus may include additional modules that perform each of the steps of the algorithm in the aforementioned flow chart of FIG. 13. As such, each step in the aforementioned flow chart of FIG. 13 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 15:
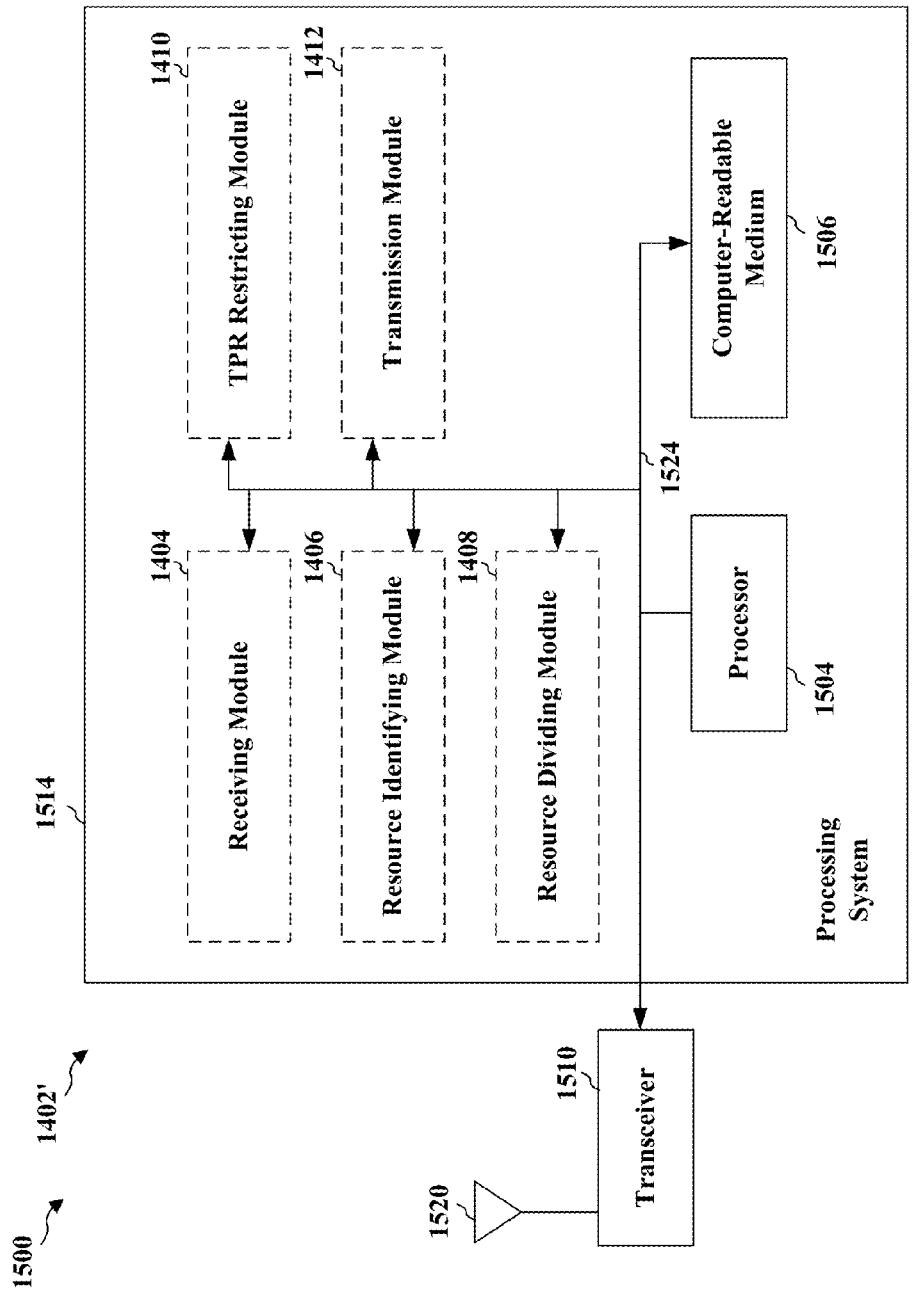
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware modules, represented by the processor 1504, the modules 1404, 1406, 1408, 1410, 1412 and the computer-readable medium 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the receiving module 1404. In addition, the transceiver 1510 receives information from the processing system 1514, specifically the transmission module 1412, and based on the received information, generates a signal to be applied to the one or more antennas 1520. The processing system 1514 includes a processor 1504 coupled to a computer-readable medium 1506. The processor 1504 is responsible for general processing, including the execution of software stored on the computer-readable medium 1506. The software, when executed by the processor 1504, causes the processing system 1514 to perform the various functions described supra for any particular apparatus. The computer-readable medium 1506 may also be used for storing data that is manipulated by the processor 1504 when executing software. The processing system further includes at least one of the modules 1404, 1406, 1408, 1410, and 1412. The modules may be software modules running in the processor 1504, resident/stored in the computer readable medium 1506, one or more hardware modules coupled to the processor 1504, or some combination thereof. The processing system 1514 may be a component of the eNB 610 and may include the memory 676 and/or at least one of the TX processor 616, the RX processor 670, and the controller/processor 675.

In one configuration, the apparatus 1402/1402' for wireless communication includes means for reserving a plurality of resource elements of at least one physical resource block (PRB) pair for transmitting one or more control channels, means for dividing the plurality of reserved resource elements into a plurality of groups, means for restricting a traffic-to-pilot ratio (TPR) of a respective group of the plurality of groups to be the same across a plurality of resource elements in the respective group, means for informing a user equipment (UE) of the restriction, and means for informing the UE of a set of PRB pairs associated with a distributed group of a control channel element.

The aforementioned means may be one or more of the aforementioned modules of the apparatus 1402 and/or the processing system 1514 of the apparatus 1402' configured to perform the functions recited by the aforementioned means. As described supra, the processing system 1514 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The invention claimed is:

1. A method of wireless communication at an evolved node B (eNB), comprising:
identifying, at the eNB, a plurality of resource elements of at least one physical resource block (PRB) pair for transmitting one or more control channels;
dividing, at the eNB, the plurality of identified resource elements into one or more groups for transmitting the one or more control channels;
varying, at the eNB, a traffic-to-pilot ratio (TPR) of the one or more groups for transmitting the one or more control channels, and restricting, at the eNB, a plurality of resource elements in a respective group of the one or more groups to a same TPR.

2. The method of claim 1, wherein the plurality of resource elements include all resource elements in the respective group.

3. The method of claim 1, wherein the TPR is a first TPR and the respective group is a first group, the method further comprising:
restricting a plurality of resource elements of a second group from the one or more groups to a second TPR, the first TPR being different from the second TPR.

4. The method of claim 3, wherein the first group is associated with a first control channel transmission and the second group is associated with a second control channel transmission, the second control channel transmission different from the first control channel transmission.

5. The method of claim 1, wherein:
the dividing includes dividing the one or more groups into a plurality of control channel elements, each control channel element comprising a number of groups; and
the restricting includes restricting a plurality of resource elements of each group in a respective control channel element of the plurality of control channel elements to the TPR.

6. The method of claim 5, wherein the restricting further comprises restricting all resource elements of each group in the respective control channel element to the TPR.

7. The method of claim 5, wherein the TPR is a first TPR and the respective control channel element is a first control channel element, the method further comprising:
restricting a plurality of resource elements of each group of a second control channel element from the plurality of control channel elements to a second TPR, the first TPR being different from the second TPR.

8. The method of claim 7, wherein the first control channel element is associated with a first control channel transmission and the second control channel element is associated with a second control channel transmission, the second control channel transmission different from the first control channel transmission.

9. The method of claim 5, wherein the groups of a control channel element are located in the same PRB pair.

10. The method of claim 5, wherein the groups of a control channel element are distributed across a plurality of PRB pairs.

11. The method of claim 10, further comprising informing a user equipment (UE) of a set of PRB pairs associated with a distributed group of a control channel element.

12. The method of claim 1, wherein the plurality of resource elements having a same TPR are of a same symbol duration of the at least one PRB pair.

13. The method of claim 12, wherein a plurality of resource elements of a first symbol duration of the at least one PRB pair have a first TPR, a plurality of resource elements of a second symbol duration of the at least one PRB pair have a second TPR, and the first TPR is different from the second TPR.

14. The method of claim 13, wherein a ratio between the first TPR and the second TPR is based on a value, the value determined on a per cell basis.

15. The method of claim 1, further comprising informing a user equipment (UE) of the restriction.

16. The method of claim 1, wherein the at least one PRB pair comprises at least one resource element that is not allocated for a control channel transmission.

17. An apparatus for wireless communication at an evolved node B (eNB), comprising:
means for identifying, at the eNB, a plurality of resource elements of at least one physical resource block (PRB) pair for transmitting one or more control channels;
means for dividing, at the eNB, the plurality of identified resource elements into one or more groups for transmitting the one or more control channels; and
means for varying, at the eNB, a traffic-to-pilot ratio (TPR) of the one or more groups for transmitting the one or more control channels and restricting, at the eNB, a plurality of resource elements in a respective group of the one or more groups to a same TPR.

18. The apparatus of claim 17, wherein the plurality of resource elements include all resource elements in the respective group.

19. The apparatus of claim 17, wherein the TPR is a first TPR and the respective group is a first group, wherein the means for restricting is configured to:
restrict a plurality of resource elements of a second group from the one or more groups to a second TPR, the first TPR being different from the second TPR, and
wherein the first group is associated with a first control channel transmission and the second group is associated with a second control channel transmission, the second control channel transmission different from the first control channel transmission.

20. The apparatus of claim 17, wherein:
the means for dividing is configured to divide the one or more groups into a plurality of control channel elements, each control channel element comprising a number of groups; and
the means for restricting is configured to restrict a plurality of resource elements of each group in a respective control channel element of the plurality of control channel elements to the TPR.

21. The apparatus of claim 20, wherein the means for restricting is configured to restrict all resource elements of each group in the respective control channel element to the TPR.

22. The apparatus of claim 20, wherein the TPR is a first TPR and the respective control channel element is a first control channel element, wherein the means for restricting is configured to restrict a plurality of resource elements of each group of a second control channel element from the plurality of control channel elements to a second TPR, the first TPR being different from the second TPR, and wherein the first control channel element is associated with a first control channel transmission and the second control channel element is associated with a second control channel transmission, the second control channel transmission different from the first control channel transmission.

23. The apparatus of claim 20, wherein the groups of a control channel element are located in the same PRB pair or distributed across a plurality of PRB pairs, the apparatus further comprising means for informing a user equipment (UE) of a set of PRB pairs associated with a distributed group of a control channel element.

24. The apparatus of claim 17, wherein the plurality of resource elements having a same TPR are of a same symbol duration of the at least one PRB pair, wherein a plurality of resource elements of a first symbol duration of the at least one PRB pair have a first TPR, a plurality of resource elements of a second symbol duration of the at least one PRB pair have a second TPR, and the first TPR is different from the second TPR, and wherein a ratio between the first TPR and the second TPR is based on a value, the value determined on a per cell basis.

25. The apparatus of claim 17, further comprising means for informing a user equipment (UE) of the restriction.

26. The apparatus of claim 17, wherein the at least one PRB pair comprises at least one resource element that is not allocated for a control channel transmission.

27. An apparatus for wireless communication at an evolved node B (eNB), comprising:
a memory coupled to at least one processor;
the at least one processor having been configured to:
identify, at the eNB, a plurality of resource elements of at least one physical resource block (PRB) pair for transmitting one or more control channels;
divide, at the eNB, the plurality of identified resource elements into one or more groups for transmitting the one or more control channels;
vary, at the eNB, a traffic-to-pilot ratio (TPR) of the one or more groups for transmitting the one or more control channels, and restrict, at the eNB, a plurality of resource elements in a respective group of the one or more groups to a same TPR.

28. A non-transitory computer-readable medium storing computer executable code for wireless communication at an evolved node B (eNB), comprising code for:
identifying, at the eNB, a plurality of resource elements of at least one physical resource block (PRB) pair for transmitting one or more control channels;
dividing, at the eNB, the plurality of identified resource elements into one or more groups for transmitting the one or more control channels;
varying, at the eNB, a traffic-to-pilot ratio (TPR) of the one or more groups for transmitting the one or more control channels, and restricting, at the eNB, a plurality of resource elements in a respective group of the one or more groups to a same TPR.

* * * * *